April 3, 1962     E. A. ADAMSON     3,028,166

COMPONENT GASKET TYPE SEAL

Filed Oct. 9, 1957

INVENTOR.
Elmer A. Adamson,
BY
Cromwell, Greist + Warden
Attys

United States Patent Office 3,028,166
Patented Apr. 3, 1962

3,028,166
COMPONENT GASKET TYPE SEAL
Elmer A. Adamson, Chicago, Ill., assignor to Chicago Rawhide Manufacturing Company, Chicago, Ill., a corporation of Illinois
Filed Oct. 9, 1957, Ser. No. 689,171
4 Claims. (Cl. 277—231)

The present invention relates to a new and improved form of oil seal of uncomplicated design which utilizes a gasket type retaining member having a pair of oppositely directed sealing lip lining members seated on the inner periphery thereof for low coefficient of friction operation on reciprocating shafts.

Shock absorber installations, such as the type used in the automotive industry, are subjected to substantial use and the reciprocating shaft portions thereof present a problem insofar as oil sealing of the same is concerned. Known types of rubber gaskets mounted on reciprocating shafts of shock absorbers are subject to substantial frictional wear due to frequency of operation resulting in relative high temperature conditions. Under these circumstances the gasket seals are not capable of long life and efficient operation. The disadvantages are true of any installation wherein a shaft is reciprocated in a sufficiently frequent manner to produce high temperature operating conditions.

It is an object of the present invention to provide a new and improved gasket type seal for use with a reciprocating shaft wherein the seal is formed from a resilient rubber or rubber-like retaining member having seated on the inner periphery thereof a sealing member lining of a material having a low coefficient of friction, the sealing member lining defining oppositely directed sealing lip portions which function to prevent leakage of oil along the shaft as well as wipe the same during reciprocation thereof.

A further object is to provide a new and improved form of component gasket type seal of the structural arrangement described in the foregoing object wherein the sealing member lining is provided with a radially outwardly directed and integrally formed seating rib portion which is received in an annular groove formed in the inner periphery of a retaining member to prevent axially displacement of the sealing member lining from the retaining member.

Still a further object is to provide a new and improved form of gasket type seal of the structural arrangement described wherein the sealing member lining is preferably formed from a fluorine substituted polyethylene resin, such as a tetrafluoroethylene resin, which exhibits high temperature and wear resistance properties capable of imparting to the seal long life, efficient operation with the low frictional qualities thereof reducing the degree of heat developed during use of the seal as, for example, in shock absorber applications.

Other objects not specifically set forth will become apparent from the following detailed description made in conjunction with the drawings wherein.

Figure 1:
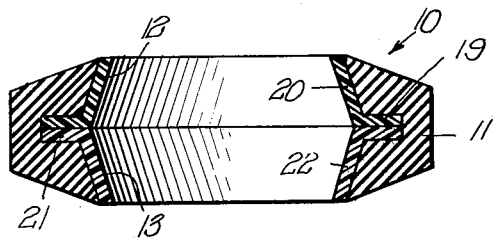
FIG. 1 is a cross sectional view of the new and improved gasket type seal of the present invention.
Figure 2:
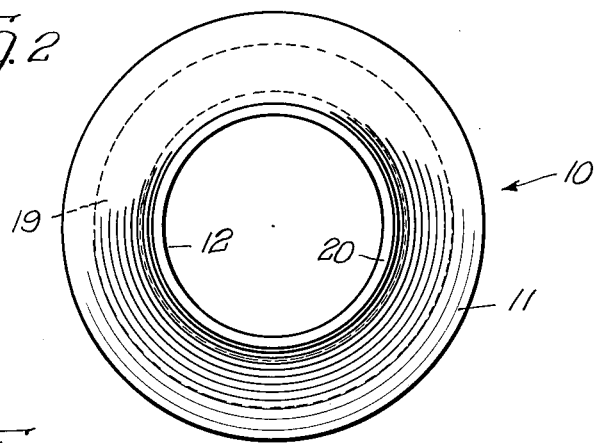
FIG. 2 is a plan view of the seal.
Figure 3:
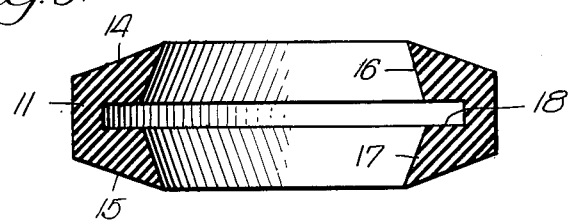
FIG. 3 is a cross sectional view of the retaining member forming a part of the seal.

In FIGS. 1 and 2 the seal 10 of the present invention is illustrated as including an annular retaining member 11 having seated on the inner periphery thereof a pair of sealing member lining components 12 and 13. Referring particularly to FIG. 3, the retaining member 11 is formed from resilient rubber or rubber-like material provided with inwardly directed, divergent outer surfaces 14 and 15, the innermost edges of which define the outer axially extremities of inclined inner peripheral faces 16 and 17 respectively. The faces 16 and 17 cooperate therebetween to provide the inner periphery of the retaining member 11 with a general V-shape cross section. The faces 16 and 17 are inclined radially inwardly to diverge from one another in opposite axial directions and the innermost edges of the same communicate with an annular groove or recess 18 formed centrally in the inner periphery of the retaining member 11.

Figure 4:
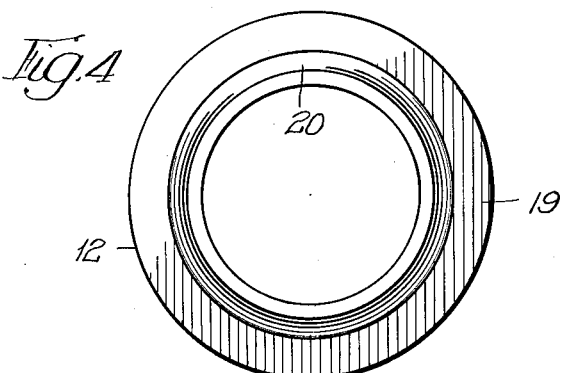
FIG. 4 is a top plan view of one of the sealing member lining components in its unmounted condition out of engagement with the inner periphery of the retaining member and as viewed from the top of FIG. 1.

Referring again to FIG. 1, the groove 18 has received therein flange portions of the sealing member lining components 12 and 13 to hold the same in their operative position in seated relation against the inner periphery of the retaining member 11 and prevent axial displacement of the components relative to the retaining member 11. FIG. 4 illustrates the sealing member lining component 12, it being understood that the component 13 is of identical structure. The component 12 is provided with a radially directed flange portion 19 integrally formed at its inner periphery with an axially directed portion 20 which is radially inwardly inclined. Similarly, as shown in FIG. 1, the component 13 is provided with a radially directed flange portion 21 integrally formed with a radially inclined axially extending portion 22.

The components 12 and 13 being of identical structural arrangement are mounted within the retaining member 11 in side-by-side relation with the flanged portions 19 and 21 thereof being received in face abutting relation within the mounting groove 18 and the flange portions 20 and 22 thereof being oppositely directed from one another. The outer surface of each flange portion 20 and 22 is seated against an inclined face 16 and 17, respectively, of the retaining member 11 and in this position each flange portion 20 and 22 defines an oppositely directed sealing lip carried by the inner periphery of the retaining member 11. The components 12 and 13 cooperate to generally define an inner sealing member of Y-shape cross section. The flange portions 19 and 21 are tightly received in the groove 18 with the resilient material of the retaining member 11 defining the groove 18 being compressed thereabout to tightly clamp the sealing member lining components 12 and 13 in their operative positions. Furthermore, the resilient material of the retaining member 11 defining the faces 16 and 17 backs up the sealing lips defined by the flange portions 20 and 22 to allow flexing of the same to the limited extend desired while at the same time holding the same in efficient sealing engagement with the surface of a shaft received through the seal 10.

Upon mounting of the seal 10 in sealing engagement with a reciprocating shaft, such as found in a shock absorber installation, the sealing lips 20 and 22 cooperate to perform dual functions by reason of their relative positioning as well as by reason of the manner in which they engage the shaft. In typical shock absorber installations the shaft seal forming a part thereof is spring loaded as is well known. The loading of the seal is such that the general V-shape arrangement of the sealing lips 20 and 22 is maintained to at least a partial degree upon mounting of the seal 10 about a reciprocating shaft. Under these circumstances each sealing lip 20 and 22 is designed to function not only as an oil retaining means but further as a shaft wiping means during reciprocation of the shaft relative to the seal. Upon thrust of the shaft in one direction, one of the sealing lips seals the shaft to prevent loss of lubricant therealong and the other sealing lip wipes the shaft clean to prevent entrance of foreign abrasive matter into the interior of the seal 10 to cause damage to the oppositely positioned sealing lip. Furthermore, the wiping function of one of the lips prevents entry of foreign matter into the oil supply during reciprocation of the shaft. In this respect one of the sealing lips will alternately function with change of direction of movement of the shaft to seal the same and wipe the same.

In shock absorber installations, such as the type used in the automotive industry, continued reciprocation of the shaft forming a part thereof results in a substantial temperature increase due to the frictional resistance established between the seal and the shaft. In order to provide for long life, efficient functioning of the seal 10, the sealing face of the same is preferably formed from material exhibiting a low coefficient of friction and high wear resistance such as a fluorine substituted polyethylene resin as, for example, tetrafluoroethylene resin. Use of resin material of this type capable of efficiently establishing an oil seal with a moving surface has been found to be highly desirable providing the resin material can be suitably mounted in oil sealing relation and effectively retained in this position.

Tetrafluoroethylene resins are flexible to a degree but are substantially tougher than rubber or rubber-like material such as the type used in forming the retaining member 11. Consequently, the forming of a complete seal from resinous material is generally considered undesirable due to the difficulties surrounding the mounting of the seal and holding of the same in its operative position in such a manner as to prevent mounting surface leakage. The seal 10 of the present invention is particularly adapted for the utilization of tetrafluoroethylene resin in forming the sealing member components 12 and 13 thereof. By use of the structural arrangement disclosed, the lining members 12 and 13 are efficiently seated on the inner periphery of a resilient rubber-like retaining member 11 with the latter being effectively mounted relative to a reciprocating shaft and the outer surface thereof effectively sealed against oil leakage. The combined components of the seal 10 provide for improved use of the separate materials thereof as the advantages of utilizing a rubber retaining member for outer surface mounting of a seal are retained with the added advantages of using sealing lip portions formed from high temperature and wear resistant materials such as tetrafluoroethylene resins. The resinous sealing lips 20 and 22 are suitably mounted by the retaining member 11 in their operative positions and efficient utilization of the properties of the resinous material is realized without sacrificing mounting surface sealing efficiency.

Obviously many modifications and variations of the invention as hereinbefore set forth may be made without departing from the spirit and scope thereof, and therefore only such limitations should be imposed as are indicated in the appended claims.

I claim:

1. A gasket type seal including an annular retaining member formed from resilient material, the inner periphery of said retaining member having seated thereon an annularly arranged lining formed from material having a low coefficient of friction for engagement with a surface to be sealed, said lining being Y-shape in cross section conforming to a V-shape contour of the inner periphery of said retaining member and defining axially oppositely extending radially inwardly directed inclined annular sealing lips for engagement with said surface, said lining having a seating rib integrally formed on and extending radially outwardly from the rear face thereof opposite the sealing faces of said lips, said rib being tightly received in an annular groove formed in the inner periphery of said retaining member to resiliently retain said lining thereon.

2. The seal of claim 1 wherein said lining is formed from a tetrafluoroethylene resin.

3. A gasket type seal including an annular retaining member formed from resilient material, the inner periphery of said retaining member having seated thereon an annularly arranged lining formed from material having a low coefficient of friction for engagement with a surface to be sealed, said lining being Y-shape in cross section conforming to a V-shape contour of the inner periphery of said retaining member and defining axially oppositely extending radially inwardly directed inclined annular sealing lips for engagement with said surface, said lining having a seating rib integrally formed on and extending radially outwardly from the rear face thereof opposite the sealing faces of said lips, said rib being tightly received in an annular groove formed in the inner periphery of said retaining member to resiliently retain said lining thereon, said lining being formed from separate annular components of identical shape each having an axially inclined portion and a radially outwardly directed portion, which components when seated on said retaining member combine to define the Y-shape of said lining.

4. The seal of claim 3 wherein said lining is formed from a tetrafluoroethylene resin.

References Cited in the file of this patent

UNITED STATES PATENTS

| | | |
|---|---|---|
| 1,313,202 | Mustor | Aug. 12, 1919 |
| 1,910,914 | Giles | May 23, 1933 |
| 1,925,729 | Gits | Sept. 5, 1933 |
| 2,547,394 | Hynes et al. | Apr. 3, 1951 |
| 2,597,976 | Cousins | May 27, 1952 |
| 2,676,040 | Dalton | Apr. 20, 1954 |
| 2,717,023 | Hetherington | Sept. 6, 1955 |
| 2,736,585 | Riesing | Feb. 28, 1956 |